Patented July 26, 1932

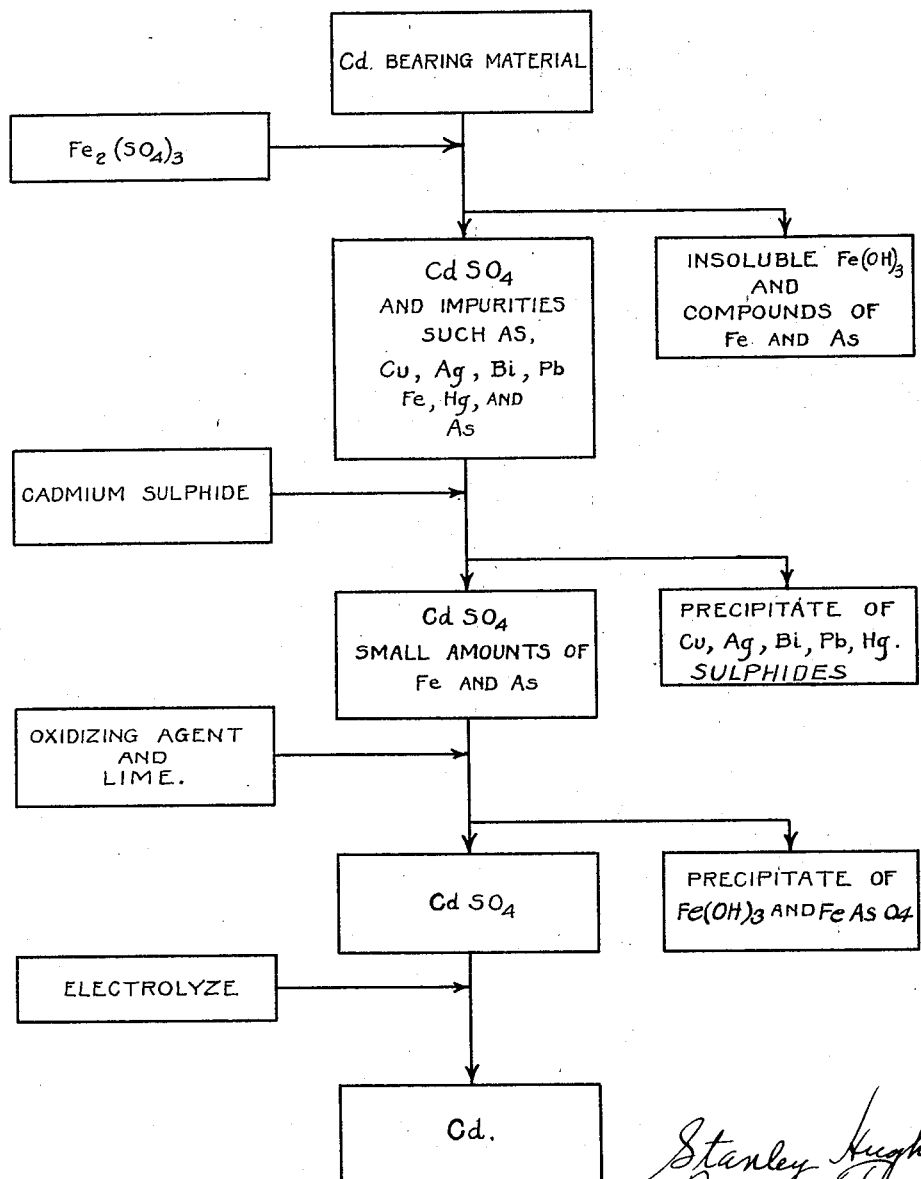

1,869,259

UNITED STATES PATENT OFFICE

STANLEY HUGHES AND ROSCOE TEATS, OF DENVER, COLORADO, ASSIGNORS TO AMERICAN SMELTING AND REFINING COMPANY, OF NEW YORK, N. Y., A CORPORATION OF NEW JERSEY

PROCESS FOR EXTRACTING AND SEPARATING CADMIUM

Application filed July 29, 1927, Serial No. 209,387. Renewed September 30, 1931.

This invention relates to the separation of metals and more particularly to the separation and recovery of cadmium from ores, furnace products, flue dusts, baghouse dusts and other materials in which the cadmium is present as an oxide, arsenate, arsenite, carbonate or other oxyacid.

The invention provides for the production of cadmium sulphate from any of the above mentioned cadmium compounds while preventing loss of cadmium due to the combination of oxides thereof with free oxides of arsenic that may be contained in the material. In addition to converting substantially the entire cadmium content of the ore, dust or other material being treated, into a soluble cadmium sulphate, various other elements such as iron and arsenic are largely prevented from going into solution and from contaminating the same. The cadmium sulphate solution may however, contain small amounts of iron, copper, silver, bismuth, lead, arsenic, mercury and antimony which are subsequently separated and removed, leaving a solution from which the cadmium may be recovered by electrolysis or other well known means.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims, the various steps in the process and the details comprising the invention will be identified by specific names for convenience but they are intended to be as generic in their application as the art will permit.

The accompanying drawing forming a part of this specification is a flow sheet illustrating the various steps in the process.

In the practice of this invention, the raw materials such as ore, furnace products, flue dusts, baghouse dust and the like from which the cadmium is to be recovered are preferably finely ground and mixed with ferric sulphate and water. The mixture is then heated to the boiling point and agitated until the chemical reaction between the cadmium, ferric sulphate and water is completed.

The cadmium present as cadmium oxide and cadmium carbonate reacts chemically with the ferric sulphate and water to form cadmium sulphate and ferric hydroxide. The cadmium combined with arsenic as arsenites and arsenates reacts chemically with the ferric sulphate to produce cadmium sulphate and insoluble compounds of iron and arsenic. The cadmium sulphate produced in the above reactions is soluble in water but the ferric hydroxide and compounds of iron and arsenic are insoluble in water, and are separated from the cadmium sulphate solution by decantation or filtration.

Ferric sulphate may be either purchased on the market or may be produced by oxidizing a ferrous sulphate solution by any well known means such as by dissolving the ferrous sulphate in water and passing through the solution a mixture of air and sulphur dioxide in finely divided bubbles.

When the cadmium sulphate solution is separated from the insoluble compounds of iron and other insoluble constituents of the raw dust, it may contain small amounts of iron, copper, silver, bismuth, lead, arsenic, mercury and antimony. The copper, silver, bismuth, lead and mercury may be precipitated from the cadmium sulphate solution by the addition of cadmium sulphide, which precipitates all of these elements as sulphides. The remaining small amounts of iron and arsenic may be removed by oxidizing the iron with sodium chlorate or other oxidizing agent, and then precipitating the iron with lime. Precipitation of the iron carries with it any arsenic that may be present in the solution, provided there is an excess of iron over the amount required to make ferric arsenate.

The cadmium sulphate solution, having been freed from all the above mentioned impurities, is ready for electrolysis. Any zinc that may be present in the dust is converted to zinc sulphate by the ferric sulphate, and remains in the solution along with the cadmium. The solution is electrolyzed by circulating in electrolytic cells, using insoluble anodes of lead or ferrosilicon and cadmium cathodes that have previously been deposited electrolytically as a sheet on aluminum cathodes. Due to the selective action between the zinc and cadmium, the latter element will be largely removed before the zinc deposits on the cathode. Hence by suitably controlling the electrolysis, the separation of the cadmium from the solution may be substantially completed and the zinc allowed to remain in the electrolyte.

The following are believed to be the equations of the principal chemical reactions used in this process:

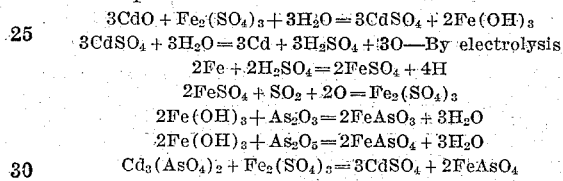

After the cadmium has been removed by means of electrolysis the sulphuric acid in the electrolyte may be employed to dissolve scrap iron for forming additional quantities of ferrous sulphate which may then be converted to ferric sulphate and utilized for forming additional quantities of cadmium sulphate.

By means of the present process, cadmium which is present in an oxidized state as cadmium arsenate, arsenite or carbonate is readily converted to cadmium sulphate from whence the cadmium may be recovered substantially free from impurities. This process prevents the combination of oxides of cadmium and arsenic and prevents loss of cadmium arsenite and arsenate which are only slightly soluble in water and would otherwise go into the residues from the leaching tanks. The ferric sulphate may be readily manufactured from waste materials without adding materially to the expense of operation.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of extracting cadmium from its oxy-compounds which comprises leaching said compounds with ferric sulphate to produce cadmium sulphate solution, removing the insoluble impurities by filtration and recovering cadmium therefrom.

2. The process of extracting cadmium from materials containing cadmium as an oxide, arsenite, arsenate, carbonate or similar compounds which comprises leaching said compound with ferric sulphate and water to produce a cadmium sulphate solution, removing impurities from the solution by filtration and recovering cadmium from the filtrate.

3. The process of recovering cadmium from ores and other materials containing oxyacids of cadmium which comprises mixing the finely divided material with a ferric sulphate solution and heating until the cadmium is oxidized and forms cadmium sulphate, removing insoluble compounds of iron and arsenic by filtration, removing copper, silver, bismuth, lead and mercury from the solution as a sulphide precipitate by the addition of cadmium sulphide and recovering cadmium from the solution.

4. The process of recovering cadmium from its oxy compounds, which comprises mixing said material with ferric sulphate solution, heating the mixture to form cadmium sulphate, removing insoluble compounds of iron and arsenic by filtration, adding cadmium sulphide to remove copper, silver, bismuth, lead and mercury as sulphide precipitates, precipitating the remaining iron with lime removing cadmium from the solution.

5. The process of recovering cadmium from its oxy compounds, which comprises leaching said materials with ferric sulphate solution to form cadmium sulphate, removing insoluble compounds of iron and arsenic by filtration, adding cadmium sulphide to remove copper, silver, bismuth, lead and mercury as sulphide precipitates, removing the remaining iron and arsenic by precipitating the iron with lime whereby the said precipitate may combine with the remaining arsenic and removing cadmium from the solution.

6. The process of recovering cadmium from its oxy compounds, which comprises mixing said materials with ferric sulphate solution, heating the mixture to form cadmium sulphate, removing insoluble compounds of iron and arsenic by filtration, adding cadmium sulphide to remove copper, silver, bismuth, lead and mercury as sulphide precipitates, removing the remaining iron and arsenic by oxidizing the iron and precipitating the iron with lime whereby the said precipitate may combine with the remaining arsenic and removing cadmium from the solution.

7. The process of recovering cadmium from its oxy compounds, which comprises mixing said materials with ferric sulphate solution, heating the mixture to form cadmium sulphate, removing insoluble compounds of iron and arsenic by filtration, adding cadmium sulphide to remove copper, silver, bismuth, lead and mercury as sulphide precipitates, removing the remaining iron and arsenic by oxidizing the iron with sodium chlorate and precipitating the iron with lime whereby the said precipitate may combine with the remaining arsenic and removing cadmium from the solution.

8. The process of recovering cadmium from its oxy compounds, which comprises mixing said materials in finely divided condition with ferric sulphate and water, heating and agitating until the cadmium is oxidized and forms cadmium sulphate, removing insoluble compounds of iron and arsenic by filtration, adding cadmium sulphide to remove copper, silver, bismuth, lead and mercury as sulphide precipitates, removing the remaining iron and arsenic by oxidizing the iron with sodium chlorate and precipitating the iron with lime whereby the said precipitate may combine with the remaining arsenic and removing cadmium from the solution.

9. The process of extracting cadmium from its oxy compounds which comprises leaching said compounds with ferric sulphate solution to produce a cadmium sulphate solution, effecting a separation between insoluble impurities and the cadmium sulphate solution and recovering cadmium from the latter.

In testimony whereof we have hereunto set our hands.

STANLEY HUGHES.
ROSCOE TEATS.